United States Patent
Iyer et al.

(10) Patent No.: US 10,235,195 B2
(45) Date of Patent: Mar. 19, 2019

(54) SYSTEMS AND METHODS FOR DISCOVERING PRIVATE DEVICES COUPLED TO A HARDWARE ACCELERATOR

(71) Applicant: Dell Products L.P., Round Rock, TX (US)

(72) Inventors: Shyam T. Iyer, Austin, TX (US); Gaurav Chawla, Austin, TX (US); Duk M. Kim, Cedar Park, TX (US); Srikrishna Ramaswamy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 15/608,695

(22) Filed: May 30, 2017

(65) Prior Publication Data

US 2018/0349160 A1    Dec. 6, 2018

(51) Int. Cl.
*G06F 9/455* (2018.01)

(52) U.S. Cl.
CPC ...... *G06F 9/45537* (2013.01); *G06F 9/45533* (2013.01); *G06F 2009/45579* (2013.01); *G06F 2009/45583* (2013.01)

(58) Field of Classification Search
CPC .................................................. G06F 9/45537
See application file for complete search history.

(56) References Cited

U.S. PATENT DOCUMENTS

2011/0202701 A1* 8/2011 Maitra ................ G06F 13/4022
710/308

OTHER PUBLICATIONS

9200 NVMe™ SSDs, 2016 (Year: 2016).*
Throughput Optimized OpenCL-based FPGA Accelerator for Large-Scale Convolutional Neural Networks, 2016 (Year: 2016).*

* cited by examiner

*Primary Examiner* — Charlie Sun
(74) *Attorney, Agent, or Firm* — Jackson Walker L.L.P.

(57) ABSTRACT

In accordance with embodiments of the present disclosure, an information handling system may include a processor subsystem having access to a memory subsystem and a device communicatively coupled to the processor subsystem, the device having an endpoint assigned for access by an operating system executing on the processor subsystem such that the endpoint appears to the operating system as a logical hardware adapter, wherein the device is configured to discover a private device coupled to the device, enumerate the private device as a managed device of the device, and map a portion of a virtual address space of an operating system executing on the processor subsystem to the private device, such that the private device is abstracted to the operating system as a virtual memory address of the operating system.

15 Claims, 6 Drawing Sheets

SYSTEMS AND METHODS FOR DISCOVERING PRIVATE DEVICES COUPLED TO A HARDWARE ACCELERATOR

TECHNICAL FIELD

This disclosure relates generally to virtualized information handling systems and more particularly to discovery of devices coupled to a hardware accelerator of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCIe") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device pass-through, such that the virtual machine may utilize a physical device directly without requiring the intermediate use of operating system drivers.

Conventional virtualized information handling systems may benefit from increased performance of virtual machines. Improved performance may also benefit virtualized systems where multiple virtual machines operate concurrently. Applications executing under a guest OS in a virtual machine may also benefit from higher performance from certain computing resources, such as storage resources.

SUMMARY

In accordance with the teachings of the present disclosure, the disadvantages and problems associated with data processing associated with devices coupled to a hardware accelerator may be reduced or eliminated.

In accordance with embodiments of the present disclosure, an information handling system may include a processor subsystem having access to a memory subsystem and a device communicatively coupled to the processor subsystem, the device having an endpoint assigned for access by an operating system executing on the processor subsystem such that the endpoint appears to the operating system as a logical hardware adapter, wherein the device is configured to discover a private device coupled to the device, enumerate the private device as a managed device of the device, and map a portion of a virtual address space of an operating system executing on the processor subsystem to the private device, such that the private device is abstracted to the operating system as a virtual memory address of the operating system.

In accordance with these and other embodiments of the present disclosure, a method may include discovering a private device coupled to a device, wherein the device is configured to communicatively couple to a processor subsystem and the device having an endpoint assigned for access by an operating system executing on the processor subsystem such that the endpoint appears to the operating system as a logical hardware adapter, enumerating the private device as a managed device of the device, and mapping a portion of a virtual address space of an operating system executing on the processor subsystem to the private device, such that the private device is abstracted to the operating system as a virtual memory address of the operating system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (i) discover a private device coupled to a device, wherein the device is configured to communicatively couple to a processor subsystem and the device having an endpoint assigned for access by an operating system executing on the processor subsystem such that the endpoint appears to the operating system as a logical hardware adapter, (ii) enumerate the private device as a managed device of the device, and (iii) map a portion of a virtual address space of an operating system executing on the processor subsystem to the private device, such that the private device is abstracted to the operating system as a virtual memory address of the operating system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

As noted previously, current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data close to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Storage software providing such functionality may interact with multiple lower level device drivers. For example: a layer on top of storage device drivers may provide access to server-resident hard drives, flash SSD drives, non-volatile memory devices, and/or SAN storage using various types of interconnect fabric (e.g., iSCSI, Fibre Channel, Fibre Channel over Ethernet, etc.). In another example, a layer on top of network drivers may provide access to storage software running on other server instances (e.g., access to a cloud). Such driver-based implementations have been challenging from the perspective of supporting multiple hypervisors and delivering adequate performance. Certain hypervisors in use today may not support third-party development of drivers, which may preclude an architecture based on optimized filter drivers in the hypervisor kernel. Other hypervisors may have different I/O architectures and device driver models, which may present challenges to developing a unified storage software for various hypervisor platforms.

Another solution is to implement the storage software as a virtual machine with pass-through access to physical storage devices and resources. However, such a solution may face serious performance issues when communicating with applications executing on neighboring virtual machines, due to low data throughput and high latency in the hypervisor driver stack. Thus, even though the underlying storage resources may deliver substantially improved performance, such as flash caches and cache networks, the performance advantages may not be experienced by applications in the guest OS using typical hypervisor driver stacks.

As will be described in further detail, access to storage resources may be improved by using an I/O accelerator device programmed by a storage virtual appliance that provides managed access to local and remote storage resources. The I/O accelerator device may utilize direct memory access (DMA) for storage operations to and from a guest OS in a virtual information handling system. Direct memory access involves the transfer of data to/from system memory without significant involvement by a processor subsystem, thereby improving data throughput and reducing a workload of the processor subsystem. As will be described in further detail, methods and systems described herein may employ an I/O accelerator device for accelerating I/O. In some embodiments, the I/O acceleration disclosed herein is used to access a storage resource by an application executing under a guest OS in a virtual machine. In other embodiments, the I/O acceleration disclosed herein may be applicable for scenarios where two virtual machines, two software modules, or different drivers running in an operating system need to send messages or data to each other, but are restricted by virtualized OS performance limitations.

Figure 1:
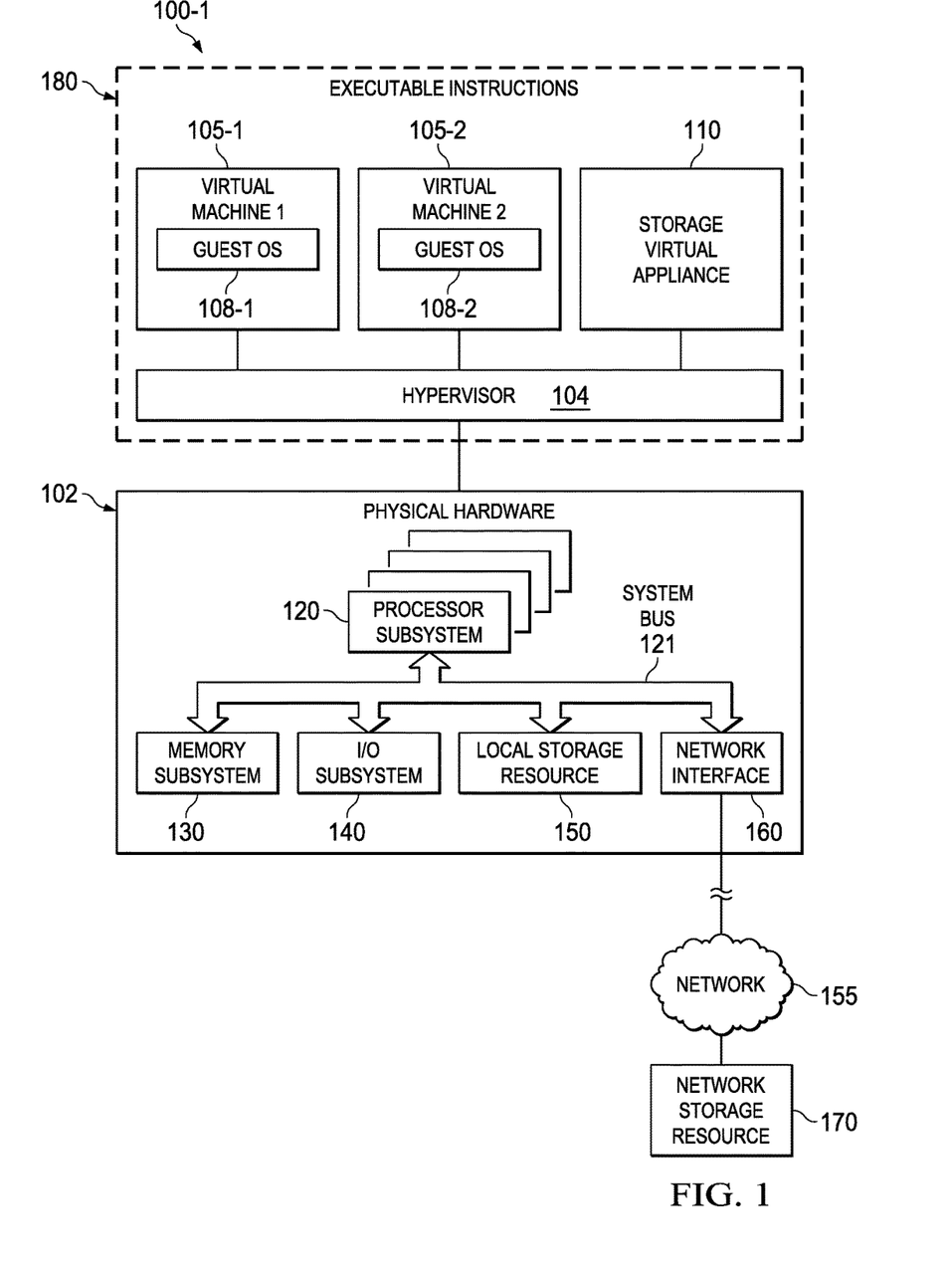
FIG. 1 illustrates a block diagram of selected elements of an example information handling system using an I/O accelerator device, in accordance with embodiments of the present disclosure.

Referring now to the drawings, FIG. 1 illustrates a block diagram of selected elements of an example information handling system using an I/O accelerator device, in accordance with embodiments of the present disclosure. As depicted in FIG. 1, system 100-1 may represent an information handling system comprising physical hardware 102, executable instructions 180 (including hypervisor 104, one or more virtual machines 105, and storage virtual appliance 110). System 100-1 may also include external or remote elements, for example, network 155 and network storage resource 170.

As shown in FIG. 1, components of physical hardware 102 may include, but are not limited to, processor subsystem 120, which may comprise one or more processors, and system bus 121 that may communicatively couple various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIe bus, HyperTransport (HT) bus, and Video Electronics Standards Association (VESA) local bus.

Network interface 160 may comprise any suitable system, apparatus, or device operable to serve as an interface between information handling system 100-1 and a network 155. Network interface 160 may enable information handling system 100-1 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, firmware, or any combination thereof.

As depicted in FIG. 1, processor subsystem 120 may comprise any suitable system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or another component of physical hardware 102). In the same or alternative embodiments, processor subsystem 120 may interpret and execute program instructions or process data stored remotely (e.g., in network storage resource 170). In particular, processor subsystem 120 may represent a multi-processor configuration that includes at least a first processor and a second processor (see also FIG. 2).

Memory subsystem 130 may comprise any suitable system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to an associated information handling system, such as system 100-1, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and data. Likewise, network storage resource 170 may comprise computer-readable media (e.g., hard disk drive, floppy disk drive, CD-ROM, or other type of rotating storage media, flash memory, EEPROM, or other type of solid state storage media) and may be generally operable to store instructions and data. In system 100-1, I/O subsystem 140 may comprise any suitable system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces. In particular, I/O subsystem 140 may include an I/O accelerator device (see also FIG. 2) for accelerating data transfers between storage virtual appliance 110 and guest OS 108, as described in greater detail elsewhere herein.

Hypervisor 104 may comprise software (i.e., executable code or instructions) and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In embodiments represented by FIG. 1, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. In some embodiments, the virtualized hardware representation presented to each of the virtual machines 105 may comprise a mutually exclusive (i.e., disjointed or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In some embodiments, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of a guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, and another guest OS on another virtual machine (not shown) may comprise a VXWORKS OS. Although system 100-1 is depicted as having two virtual machines 105-1, 105-2, and storage virtual appliance 110, it will be understood that, in particular embodiments, different numbers of virtual machines 105 may be executing on system 100-1 at any given time.

Storage virtual appliance 110 may represent storage software executing on hypervisor 104. Although storage virtual appliance 110 may be implemented as a virtual machine, and may execute in a similar environment and address space as described above with respect to virtual machines 105, storage virtual appliance 110 may be dedicated to providing access to storage resources to instances of guest OS 108. Thus, storage virtual appliance 110 may not itself be a host for a guest OS that is provided as a resource to users, but may be an embedded feature of information handling system 100-1. It will be understood, however, that storage virtual appliance 110 may include an embedded virtualized OS (not shown) similar to various implementations of guest OS 108 described previously herein. In particular, storage virtual appliance 110 may enjoy pass-through device access to various devices and interfaces for accessing storage resources (local and/or remote). Additionally, storage virtual appliance 110 may be enabled to provide logical communication connections between desired storage resources and guest OS 108 using the I/O accelerator device included in I/O subsystem 140 for very high data throughput rates and very low latency transfer operations, as described herein.

In operation of system 100-1 shown in FIG. 1, hypervisor 104 of information handling system 100-1 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104. Each guest OS 108 and/or application executing under guest OS 108 may be presented with storage resources that are managed by storage virtual appliance 110. In other words, storage virtual appliance 110 may be enabled to mount and partition various combinations of physical storage resources, including local storage resources and remote storage resources, and present these physical storage resources as desired logical storage devices for access by guest OS 108. In particular, storage virtual appliance 110 may be enabled to use an I/O accelerator device, which may be a PCIe device represented by I/O subsystem 140 in FIG. 1, for access to storage resources by applications executing under guest OS 108 of virtual machine 105. Also, the features of storage virtual appliance 110 described herein may further allow for implementation in a manner that is independent, or largely independent, of any particular implementation of hypervisor 104.

Figure 2:
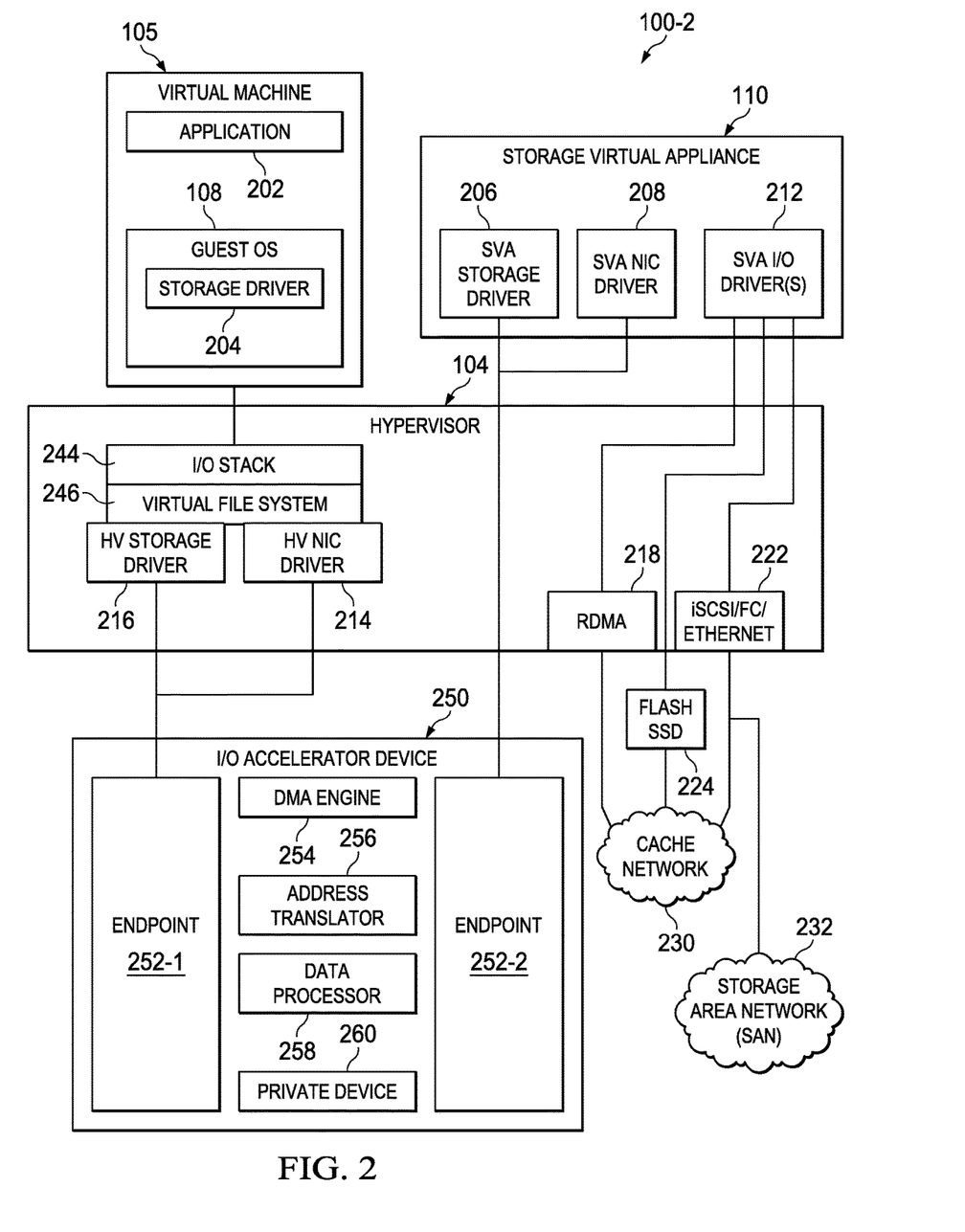
FIG. 2 illustrates a block diagram of selected elements of an example information handling system using an I/O accelerator device, in accordance with embodiments of the present disclosure.

FIG. 2 illustrates a block diagram of selected elements of an example information handling system 100-2 using an I/O accelerator device 250, in accordance with embodiments of the present disclosure. In FIG. 2, system 100-2 may represent an information handling system that is an embodiment of system 100-1 (see FIG. 1). As shown, system 100-2 may include further details regarding the operation and use of I/O accelerator device 250, while other elements shown in system 100-1 have been omitted from FIG. 2 for descriptive clarity. In FIG. 2, for example, virtual machine 105 and guest OS 108 are shown in singular, though they may represent any number of instances of virtual machine 105 and guest OS 108.

As shown in FIG. 2, virtual machine 105 may execute application 202 and guest OS 108 under which storage driver 204 may be installed and loaded. Storage driver 204 may enable virtual machine 105 to access storage resources via I/O stack 244, virtual file system 246, hypervisor (HV) storage driver 216, and/or HV network integrated controller (NIC) driver 214, which may be loaded into hypervisor 104. I/O stack 244 may provide interfaces to VM-facing I/O by hypervisor 104 to interact with storage driver 204 executing on virtual machine 105. Virtual file system 246 may comprise a file system provided by hypervisor 104, for example, for access by guest OS 108.

As shown in FIG. 2, virtual file system 246 may interact with HV storage driver 216 and HV NIC driver 214, to access I/O accelerator device 250. Depending on a configuration (i.e., class code) used with I/O accelerator device 250, endpoint 252-1 on I/O accelerator device 250 may appear as a memory/storage resource (using HV storage driver 216 for block access) or as a network controller (using HV NIC driver 214 for file access) to virtual file system 246 in different embodiments. In particular, I/O accelerator device 250 may enable data transfers at high data rates while subjecting processor subsystem 120 with minimal workload, and thus, represents an efficient mechanism for I/O acceleration, as described herein.

Additionally, storage virtual appliance 110 is shown in FIG. 2 as comprising SVA storage driver 206, SVA NIC driver 208, and SVA I/O drivers 212. As with virtual file system 246, storage virtual appliance 110 may interact with I/O accelerator device 250 using SVA storage driver 206 or SVA NIC driver 208, depending on a configuration of endpoint 252-2 in I/O accelerator device 250. Thus, depending on the configuration, endpoint 252-2 may appear as a memory/storage resource (using SVA storage driver 206 for block access) or a network controller (using SVA NIC driver 208 for file access) to storage virtual appliance 110. In various embodiments, storage virtual appliance 110 may enjoy pass-through access to endpoint 252-2 of I/O accelerator device 250, as described herein.

In FIG. 2, SVA I/O drivers 212 may represent "back-end" drivers that may enable storage virtual appliance 110 to access and provide access to various storage resources. As shown, SVA I/O drivers 212 may have pass-through access to remote direct memory access (RDMA) 218, iSCSI/Fibre Channel (FC)/Ethernet 222, and flash SSD 224. For example, RDMA 218, flash SSD 224, and/or iSCSI/FC/Ethernet 222 may participate in cache network 230, which may be a high performance network for caching storage operations and/or data between a plurality of information handling systems (not shown), such as system 100. As shown, iSCSI/FC/Ethernet 222 may also provide access to storage area network (SAN) 232, which may include various external storage resources, such as network-accessible storage arrays.

In FIG. 2, I/O accelerator device 250 is shown including endpoints 252, DMA engine 254, address translator 256, data processor 258, and private device 260. In some embodiments, I/O accelerator device 250 may be implemented as a PCI device, although implementations using other standards, interfaces, and/or protocols may be used. I/O accelerator device 250 may include additional components in various embodiments, such as memory media for buffers or other types of local storage, which are omitted from FIG. 2 for descriptive clarity. As shown, endpoint 252-1 may be configured to be accessible via a first root port, which may enable access by HV storage driver 216 or HV NIC driver 214. Endpoint 252-2 may be configured to be accessible by a second root port, which may enable access by SVA storage driver 206 or SVA NIC driver 208. Thus, an exemplary embodiment of a I/O accelerator device 250 implemented as a single printed circuit board (e.g., a x16 PCIe adapter board) and plugged into an appropriate slot (e.g., a x16 PCIe slot of information handling system 100-2) may appear as two endpoints 252 (e.g., x8 PCIe endpoints) that are logically addressable as individual endpoints (e.g., PCIe endpoints) via the two root ports in the system root complex. The first and second root ports may represent the root complex of a processor (such as processor subsystem 120) or a chipset associated with the processor. The root complex may include an input/output memory management unit (IOMMU) that isolates memory regions used by I/O devices by mapping specific memory regions to I/O devices using system software for exclusive access. The IOMMU may support direct memory access (DMA) using a DMA Remapping Hardware Unit Definition (DRHD). To a host of I/O accelerator device 250, such as hypervisor 104, I/O accelerator device 250 may appear as two independent devices (e.g., PCIe devices), namely endpoints 252-1 and 252-2 (e.g., PCI endpoints). Thus, hypervisor 104 may be unaware of, and may not have access to, local processing and data transfer that occurs via I/O accelerator device 250, including DMA operations performed by I/O accelerator device 250.

Accordingly, upon startup of system 100-2, pre-boot software may present endpoints 252 as logical devices, of which only endpoint 252-2 is visible to hypervisor 104. Then, hypervisor 104 may be configured to assign endpoint 252-2 for exclusive access by storage virtual appliance 110. Then, storage virtual appliance 110 may receive pass-through access to endpoint 252-2 from hypervisor 104, through which storage virtual appliance 110 may control operation of I/O accelerator device 250. Then, hypervisor 104 may boot and load storage virtual appliance 110. Upon loading and startup, storage virtual appliance 110 may provide configuration details for both endpoints 252, including a class code for a type of device (e.g., a PCIe device). Then, storage virtual appliance 110 may initiate a function level reset of PCIe endpoint 252-2 to implement the desired configuration. Storage virtual appliance 110 may then initiate a function level reset of endpoint 252-1, which may result in hypervisor 104 recognizing endpoint 252-1 as a new device that has been hot-plugged into system 100-2. As a result, hypervisor 104 may load an appropriate driver for endpoint 252-1 and I/O operations may proceed. Hypervisor 104 may exclusively access endpoint 252-1 for allocating buffers and transmitting or receiving commands from endpoint 252-2. However, hypervisor 104 may remain unaware of processing and data transfer operations performed by I/O accelerator device 250, including DMA operations and programmed I/O operations.

Accordingly, DMA engine 254 may perform DMA programming of an IOMMU and may support scatter-gather or memory-to-memory types of access. Address translator 256 may perform address translations for data transfers and may use the IOMMU to resolve addresses from certain memory spaces in system 100-2 (see also FIG. 3). In certain embodiments, address translator 256 may maintain a local address translation cache. Data processor 258 may provide general data processing functionality that includes processing of data during data transfer operations. Data processor 258 may include, or have access to, memory included with I/O accelerator device 250. In certain embodiments, I/O accelerator device 250 may include an onboard memory controller and expansion slots to receive local RAM that is used by data processor 258. Operations that are supported by data processor 258 and that may be programmable by storage virtual appliance 110 may include encryption, compression, calculations on data (i.e., checksums, etc.), and malicious code detection. Also shown in FIG. 2 is private device 260, which may represent any of a variety of devices for hidden or private use by storage virtual appliance 110. In other words, because hypervisor 104 is unaware of internal features and actions of I/O accelerator device 250, private device 260 may be used by storage virtual appliance 110 independently of and without knowledge of hypervisor 104. In various embodiments, private device 260 may be selected from a memory device, a network interface adapter, a storage adapter, and a storage device. In some embodiments, private device 260 may be removable or hot-pluggable, such as a universal serial bus (USB) device, for example.

Figure 3:
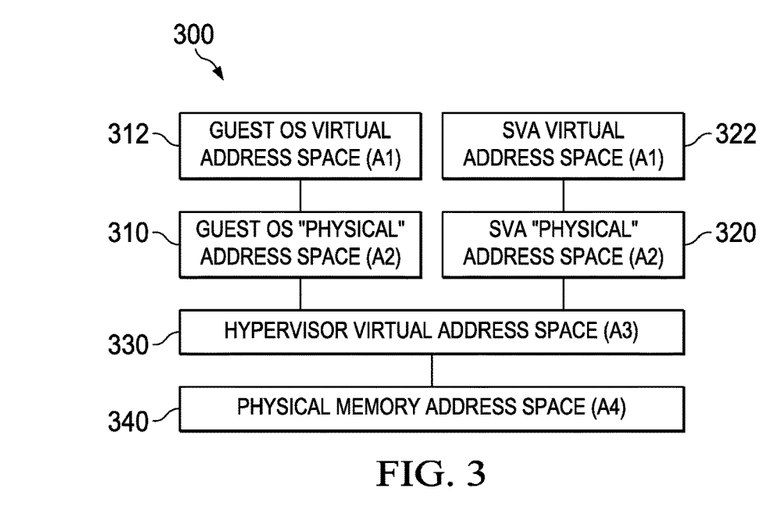
FIG. 3 illustrates a block diagram of selected elements of an example memory space for use with an I/O accelerator device, in accordance with embodiments of the present disclosure.

FIG. 3 illustrates a block diagram of selected elements of an example memory space 300 for use with I/O accelerator device 250, in accordance with embodiments of the present disclosure. In FIG. 3, memory space 300 depicts various memory addressing spaces, or simply "address spaces" for various virtualization layers included in information handling system 100 (see FIGS. 1 and 2). The different memory addresses shown in memory space 300 may be used by address translator 256, as described above with respect to FIG. 2.

As shown in FIG. 3, memory space 300 may include physical memory address space (A4) 340 for addressing physical memory. For example, in information handling system 100, processor subsystem 120 may access memory subsystem 130, which may provide physical memory address space (A4) 340. Because hypervisor 104 executes on physical computing resources, hypervisor virtual address space (A3) 330 may represent a virtual address space that is based on physical memory address space (A4) 340. A virtual address space may enable addressing of larger memory spaces with a limited amount of physical memory and may rely upon an external storage resource (not shown in FIG. 3) for offloading or caching operations. Hypervisor virtual address space (A3) 330 may represent an internal address space used by hypervisor 104. Hypervisor 104 may further generate so-called "physical" address spaces within hypervisor virtual address space (A3) 330 and present these "physical" address spaces to virtual machines 105 and storage virtual appliance 110 for virtualized execution. From the perspective of virtual machines 105 and storage virtual appliance 110, the "physical" address space provided by hypervisor 104 may appear as a real physical memory space. As shown, guest OS "physical" address space (A2) 310 and SVA "physical" address space (A2) 320 may represent the "physical" address space provided by hypervisor 104 to guest OS 108 and storage virtual appliance 110, respectively. Finally, guest OS virtual address space (A1) 312 may represent a virtual address space that guest OS 108 implements using guest OS "physical" address space (A2) 310. SVA virtual address space (A1) 322 may represent a virtual address space that storage virtual appliance 110 implements using SVA "physical" address space (A2) 320.

It is noted that the labels A1, A2, A3, and A4 may refer to specific hierarchical levels of real or virtualized memory spaces, as described above, with respect to information handling system 100. For descriptive clarity, the labels A1, A2, A3, and A4 may be referred to in describing operation of I/O accelerator device 250 in further detail with reference to FIGS. 1-3.

In operation, I/O accelerator device 250 may support various data transfer operations including I/O protocol read and write operations. Specifically, application 202 may issue a read operation from a file (or a portion thereof) that storage virtual appliance 110 provides access to via SVA I/O drivers 212. Application 202 may issue a write operation to a file that storage virtual appliance 110 provides access to via SVA I/O drivers 212. I/O accelerator device 250 may accelerate processing of read and write operations by hypervisor 104, as compared to other conventional methods.

In an exemplary embodiment of an I/O protocol read operation, application 202 may issue a read request for a file in address space A1 for virtual machine 105. Storage driver 204 may translate memory addresses associated with the read request into address space A2 for virtual machine 105. Then, virtual file system 246 (or one of HV storage driver 216, HV NIC driver 214) may translate the memory addresses into address space A4 for hypervisor 104 (referred to as "A4 (HV)") and store the A4 memory addresses in a protocol I/O command list before sending a doorbell to endpoint 252-1. Protocol I/O commands may be read or write commands. The doorbell received on endpoint 252-1 may be sent to storage virtual appliance 110 by endpoint 252-2 as a translated memory write using address translator 256 in address space A2 (SVA). SVA storage driver 206 may note the doorbell and may then read the I/O command list in address space A4 (HV) by sending results of read operations (e.g., PCIe read operations) to endpoint 252-2. Address translator 256 may translate the read operations directed to endpoint 252-2 into read operations directed to buffers in address space A4 (HV) that contain the protocol I/O command list. SVA storage driver 206 may now have read the command list containing the addresses in address space A4 (HV). Because the addresses of the requested data are known to SVA storage driver 206 (or SVA NIC driver 208) for I/O protocol read operations, the driver may program the address of the data in address space A2 (SVA) and the address of the buffer allocated by hypervisor 104 in address space A4 (HV) into DMA engine 254. DMA engine 254 may request a translation for addresses in address space A2 (SVA) to address space A4 (HV) from IOMMU. In some embodiments, DMA engine 254 may cache these addresses for performance purposes. DMA engine 254 may perform reads from address space A2 (SVA) and writes to address space A4 (HV). Upon completion, DMA engine 254 may send interrupts (or another type of signal) to the HV driver (HV storage driver 216 or HV NIC driver 214) and to the SVA driver (SVA storage driver 206 or SVA NIC driver 208). The HV driver may now write the read data into buffers that return the response of the file I/O read in virtual file system 246. This buffer data is further propagated according to the I/O read request up through storage driver 204, guest OS 108, and application 202.

For a write operation, a similar process as described above for the read operation may be performed with the exception that DMA engine 254 may be programmed to perform a data transfer from address space A4 (HV) to buffers allocated in address space A2 (SVA).

Figure 4:
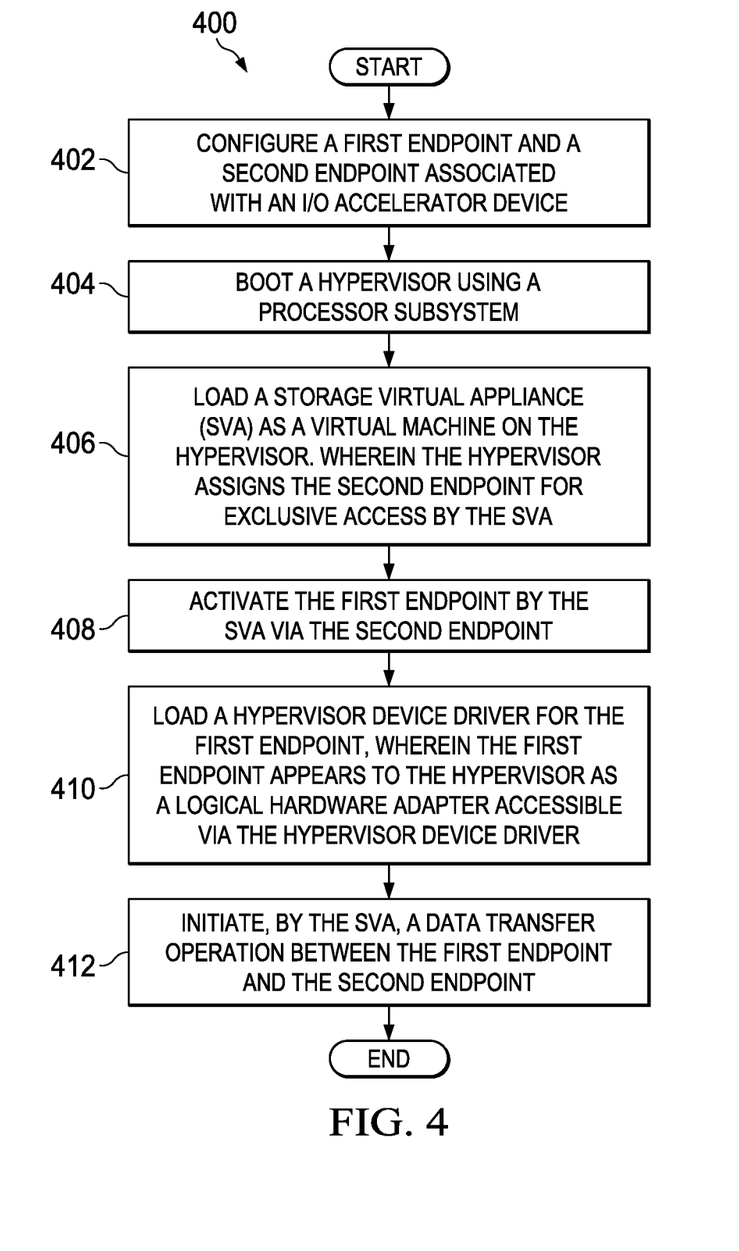
FIG. 4 illustrates a flowchart of an example method for I/O acceleration using an I/O accelerator device, in accordance with embodiments of the present disclosure.

FIG. 4 illustrates a flowchart of an example method 400 for I/O acceleration using an I/O accelerator device (e.g., I/O accelerator device 250), in accordance with embodiments of the present disclosure. According to some embodiments, method 400 may begin at step 402. As noted above, teachings of the present disclosure may be implemented in a variety of configurations of information handling system 100. As such, the preferred initialization point for method 400 and the order of the steps comprising method 400 may depend on the implementation chosen.

At step 402, method 400 may configure a first endpoint (e.g., endpoint 252-1) and a second endpoint (e.g., endpoint 252-2) associated with an I/O accelerator device (e.g., I/O accelerator device 250). The configuration in step 402 may represent pre-boot configuration. At step 404, a hypervisor (e.g., hypervisor 104) may boot using a processor subsystem (e.g., processor subsystem 120). At step 406, a storage virtual appliance (SVA) (e.g., storage virtual appliance 110) may be loaded as a virtual machine on the hypervisor (e.g., hypervisor 104), wherein the hypervisor may assign the second endpoint (e.g., endpoint 252-2) for exclusive access by the SVA. The hypervisor may act according to a pre-boot configuration performed in step 402. At step 408, the SVA (e.g., storage virtual appliance 110) may activate the first endpoint (e.g., endpoint 252-1) via the second endpoint (e.g., endpoint 252-2). At step 410, a hypervisor device driver (e.g., HV storage driver 216 or HV NIC driver 214) may be loaded for the first endpoint (e.g., endpoint 252-1), wherein the first endpoint may appear to the hypervisor as a logical hardware adapter accessible via the hypervisor device driver. At step 412, a data transfer operation may be initiated by the SVA (e.g., storage virtual appliance 110) between the first endpoint (e.g., endpoint 252-1) and the second endpoint (e.g., endpoint 252-2).

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 100 or any other system operable to implement method 400. In certain embodiments, method 400 may be implemented partially or fully in software and/or firmware embodied in computer-readable media.

Figure 5:
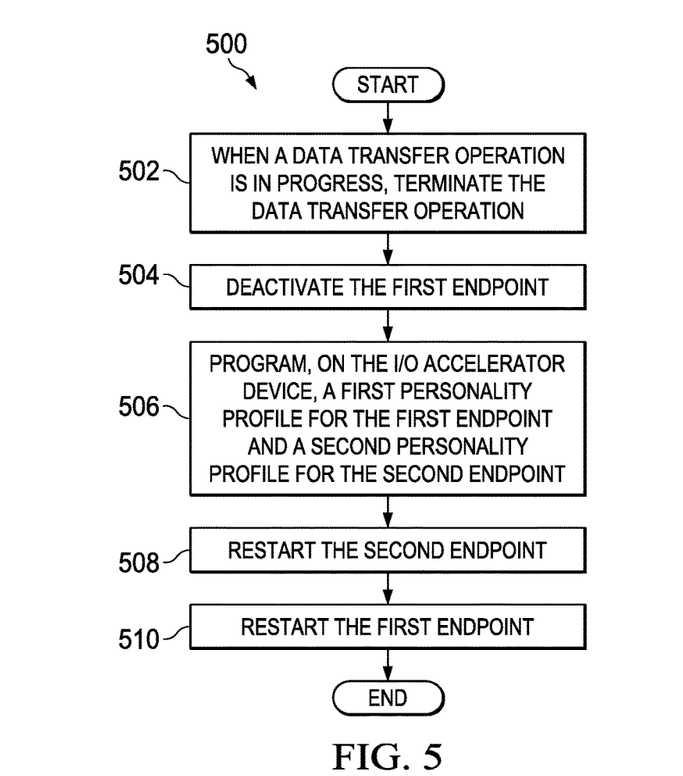
FIG. 5 illustrates a flowchart of an example method for I/O acceleration using an I/O accelerator device, in accordance with embodiments of the present disclosure.

FIG. 5 illustrates a flowchart of an example method 500 for I/O acceleration using an I/O accelerator device (e.g., I/O accelerator device 250), in accordance with embodiments of the present disclosure. According to some embodiments, method 500 may begin at step 502. As noted above, teachings of the present disclosure may be implemented in a variety of configurations of information handling system 100. As such, the preferred initialization point for method 500 and the order of the steps comprising method 500 may depend on the implementation chosen.

At step 502, a data transfer operation in progress may be terminated. At step 504, the first endpoint (e.g., endpoint 252-1) may be deactivated. At step 506, on the I/O accelerator device (e.g., I/O accelerator device 250), a first personality profile for the first endpoint (e.g., endpoint 252-1) and a second personality profile for the second endpoint (e.g., endpoint 252-2) may be programmed. A personality profile may include various settings and attributes for an endpoint (e.g., a PCIe endpoint) and may cause the endpoint to behave (or to appear) as a specific type of device. At step 508, the second endpoint (e.g., endpoint 252-2) may be restarted. At step 510, the first endpoint (e.g., endpoint 252-1) may be restarted. Responsive to the restarting of the first endpoint (e.g., endpoint 252-1), the hypervisor (e.g., hypervisor 104) may detect and load a driver (e.g., HV storage driver 216 or HV NIC driver 214) for the first endpoint.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 100 or any other system operable to implement method 500. In certain embodiments, method 500 may be implemented partially or fully in software and/or firmware embodied in computer-readable media.

As described in detail herein, disclosed methods and systems for I/O acceleration using an I/O accelerator device on a virtualized information handling system include pre-boot configuration of first and second device endpoints that appear as independent devices. After loading a storage virtual appliance that has exclusive access to the second device endpoint, a hypervisor may detect and load drivers for the first device endpoint. The storage virtual appliance may then initiate data transfer I/O operations using the I/O accelerator device. The data transfer operations may be read or write operations to a storage device that the storage virtual appliance provides access to. The I/O accelerator device may use direct memory access (DMA).

Figure 6:
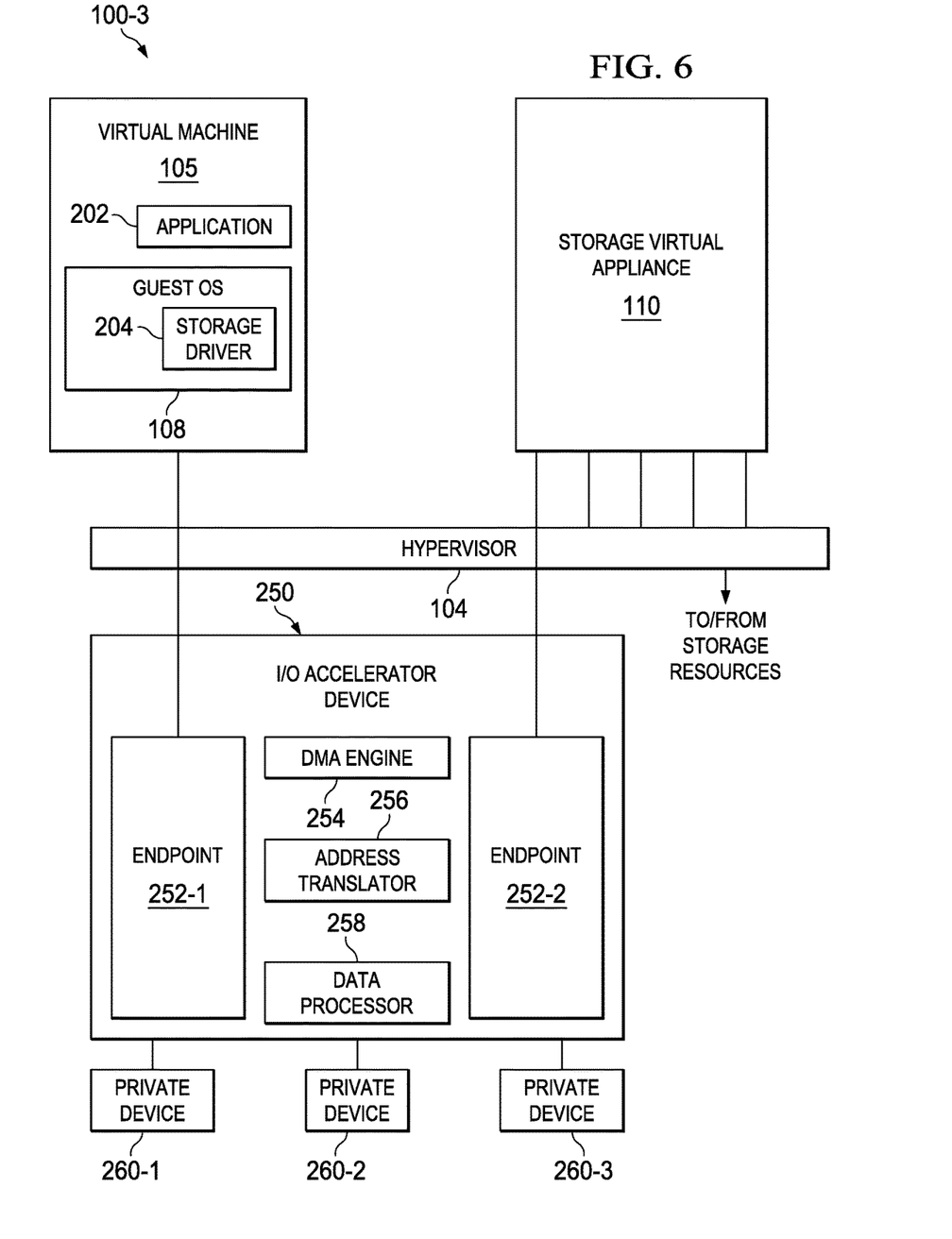
FIG. 6 illustrates a block diagram of selected elements of an example information handling system using an I/O accelerator device as a hardware driver for private devices coupled to the I/O accelerator device, in accordance with embodiments of the present disclosure.

FIG. 6 illustrates a block diagram of selected elements of an example information handling system 100-3 using I/O accelerator device 250 as a hardware driver for private devices coupled to the I/O accelerator device, in accordance with embodiments of the present disclosure. In FIG. 6, system 100-3 may represent an information handling system that is an embodiment of system 100-1 (see FIG. 1) and/or system 100-2 (see FIG. 2). As shown, system 100-3 may include further details regarding the operation and use of I/O accelerator device 250, while other elements shown in systems 100-1 and 100-2 have been omitted from FIG. 6 for descriptive clarity. In FIG. 6, for example, for descriptive clarity, various components of virtual machine 105 (e.g., application 202, storage driver 204), storage virtual appliance 110 (e.g., SVA storage driver 206, SVA NIC driver 208, SVA I/O driver(s) 212), and hypervisor 104 (e.g., I/O stack 244, virtual file system 246, HV storage driver 216, HV NIC driver 214, RDMA 218, iSCSI/FC/Ethernet interface 222) are not shown. In the embodiments represented by FIG. 6, virtual machine 105 may interface with endpoint 252-1 of I/O accelerator device 250 and storage virtual appliance 110 may interface with endpoint 252-2 of I/O accelerator 250 to facilitate I/O between virtual machine 105 and storage virtual appliance 110, as described above with respect to FIGS. 1-5. In addition or alternatively, I/O accelerator device 250 may be configured to discover, manage, and provide address translation between hypervisor 104 and private devices 260 (e.g., private devices 260-1, 260-2, and 260-3) of I/O accelerator device 250.

As described above with respect to FIG. 2, a private device 260 may be used by storage virtual appliance 110 independently of and without knowledge of hypervisor 104. In addition or alternatively, a private device 260 may be instantiated as "downstream" devices instantiated and controlled by I/O accelerator device 250 but hidden from virtual machine 105, storage virtual appliance 110, and hypervisor 104. Thus, such private devices 260 may be abstracted from virtual machine 105 and/or storage virtual appliance 110, with virtual machine 105 capable of seeing endpoint 252-1 of I/O accelerator device 250, but not private devices 260 sitting "behind" I/O accelerator device 250 and storage virtual appliance 110 capable of seeing endpoint 252-2 of I/O accelerator device 250, but not private devices 260 sitting "behind" I/O accelerator device 250.

Although FIG. 2 depicts a private device 260 internal to I/O accelerator device 250, in FIG. 6, private devices 260 are shown as devices which are removable or hot-pluggable from I/O accelerator device 250 (e.g., a universal serial bus (USB) device) via a suitable port of I/O accelerator device 250. A private device 260 may be selected from a memory device, a network interface adapter, a storage adapter, and a storage device. A private device 260 may be capable of communication with I/O accelerator device 250 via any suitable communications protocol or standard, including without limitation PCIe and Inter-Integrated Circuit (I2C).

In operation, upon initialization of I/O accelerator device 250 or insertion of a private device 260 into a corresponding port of I/O accelerator device 250, data processor 258 may discover private devices 260 of I/O accelerator device 250 and enumerate such devices. Data processor 258 may also cause address translator 256 to map particular memory addresses of hypervisor 104 (e.g., a hypervisor virtual address space 330) to individual private devices 260, thus creating memory-mapped I/O (MMIO) apertures wherein private devices 260 are abstracted to hypervisor 104 as virtual memory addresses, thus allowing access to private devices 260 while preserving management simplicity of virtual machine 105, storage virtual appliance 110, and/or hypervisor 104.

Figure 7:
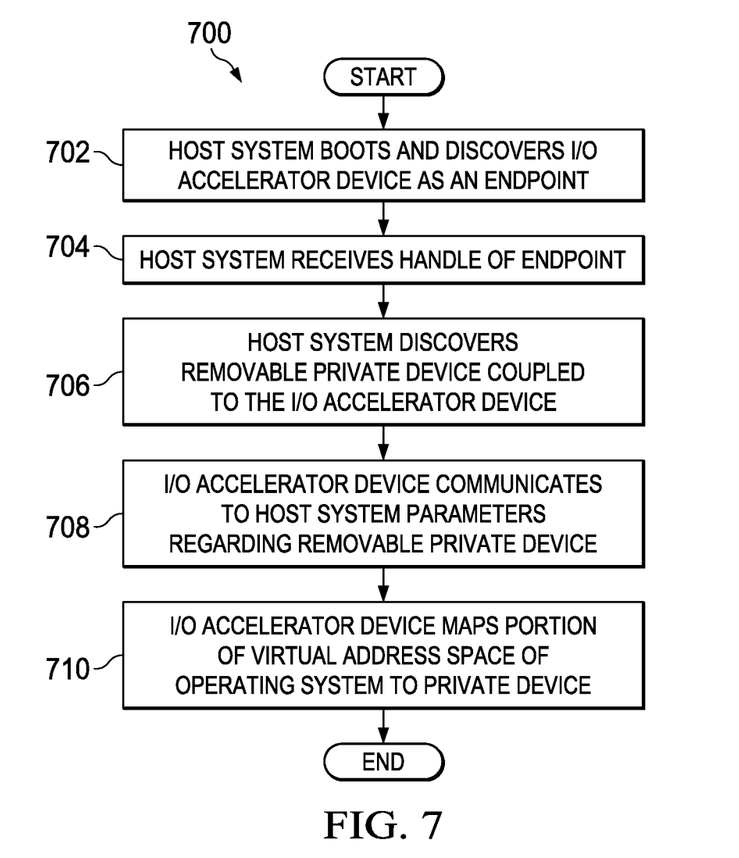
FIG. 7 illustrates a flowchart of an example method for using an I/O accelerator device as a hardware driver for private devices coupled to the I/O accelerator device, in accordance with embodiments of the present disclosure.

FIG. 7 illustrates a flowchart of an example method 700 for using an I/O accelerator device (e.g., I/O accelerator device 250) as a hardware driver for private devices coupled to the I/O accelerator device, in accordance with embodiments of the present disclosure. According to some embodiments, method 700 may begin at step 702. As noted above, teachings of the present disclosure may be implemented in a variety of configurations of information handling system 100. As such, the preferred initialization point for method 700 and the order of the steps comprising method 700 may depend on the implementation chosen.

At step 702, a host system (e.g., a host driver such as storage driver 204 or a control virtual machine driver of virtual machine 105) may boot and discover an I/O accelerator device (e.g., I/O accelerator device 250) as an endpoint (e.g., a PCIe endpoint). At step 704, the host system may receive a handle or other unique identifier of the endpoint in order to manage the endpoint. At step 706, the host system may discover a removable private device (e.g., private device 260) coupled to the I/O accelerator device. In some embodiments, the host system may discover a removable private device by using the handle of the accelerator device and by reading customized configuration registers exposed by the I/O accelerator device.

At step 708, the I/O accelerator device may communicate to the host system parameters regarding the removable private device (e.g., class, type, features of the private device). In some embodiments, I/O accelerator device may communicate such parameters based on information stored in additional customized configuration registers exposed by the I/O accelerator device.

At step 710, the I/O accelerator device may map a portion of a virtual address space of an operating system (e.g., hypervisor 104) having access to an endpoint (e.g., endpoint 252-1 or endpoint 252-2) of the I/O accelerator device to the private device, to create an MMIO aperture to abstract the private device to the operating system as a virtual memory address of the operating system. Accordingly, to access the private device, the operating system may perform I/O operations to the virtual memory address(es) mapped by the accelerator device to the private device.

In some embodiments, the host system may coordinate instantiating private device-specific initializations. For example, in such embodiments, each device-specific initialization may be performed by a driver or firmware stack plugin of the host system.

Although FIG. 7 discloses a particular number of steps to be taken with respect to method 700, method 700 may be executed with greater or fewer steps than those depicted in FIG. 7. In addition, although FIG. 7 discloses a certain order of steps to be taken with respect to method 700, the steps comprising method 700 may be completed in any suitable order.

Method 700 may be implemented using information handling system 100 or any other system operable to implement method 700. In certain embodiments, method 700 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
a processor subsystem having access to a memory subsystem; and
a device communicatively coupled to the processor subsystem, the device having an endpoint assigned for access by an operating system executing on the processor subsystem such that the endpoint appears to the operating system as a logical hardware adapter, wherein:
the endpoint is assigned for access to a storage virtual appliance loaded as a virtual machine of a hypervisor and the hypervisor runs on the operating system; and
the device is configured to:
discover a private device coupled to the device;
enumerate the private device as a managed device of the device; and
map a portion of a virtual address space of an operating system executing on the processor subsystem to the private device, such that the private device is abstracted to the operating system as a virtual memory address of the operating system.

2. The information handling system of claim 1, wherein:
the processor subsystem executes a first virtual machine of the hypervisor and storage virtual appliance loaded as a second virtual machine of the hypervisor;
the device has a second endpoint assigned for access to the storage virtual appliance; and
the device is configured to accelerate data transfer operations between a first virtual machine and the storage virtual appliance via the endpoint and the second endpoint.

3. The information handling system of claim 1, wherein the device comprises a Peripheral Component Interconnect device.

4. The information handling system of claim 1, wherein the private device comprises one of a Peripheral Component Interconnect device and an Inter-Integrated Circuit device.

5. The information handling system of claim 1, wherein the device comprises a hardware accelerator device.

6. A method comprising:
discovering a private device coupled to a device, wherein the device is configured to communicatively couple to a processor subsystem and the device having an endpoint assigned for access by an operating system executing on the processor subsystem such that the endpoint appears to the operating system as a logical hardware adapter, wherein the endpoint is assigned for access to a storage virtual appliance loaded as a virtual machine of a hypervisor, and wherein the hypervisor runs on the operating system;
enumerating the private device as a managed device of the device; and mapping a portion of a virtual address space of an operating system executing on the processor subsystem.

7. The method of claim 6, wherein the device comprises a Peripheral Component Interconnect device.

8. The method of claim 6, wherein the private device comprises one of a Peripheral Component Interconnect device and an Inter-Integrated Circuit device.

9. The method of claim 6, wherein the device comprises a hardware accelerator device.

10. The method of claim 6, wherein:
the processor subsystem executes a first virtual machine of the hypervisor and storage virtual appliance loaded as a second virtual machine of the hypervisor;
the device has a second endpoint assigned for access to the storage virtual appliance; and
the device is configured to accelerate data transfer operations between a first virtual machine and the storage virtual appliance via the endpoint and the second endpoint.

11. An article of of manufacture comprising:
a non-transitory computer-readable medium; and
computer-executable instructions carried on the computer-readable medium, the instructions readable by a processor, the instructions, when read and executed, for causing the processor to:
discover a private device coupled to a device, wherein the device is configured to communicatively couple to a processor subsystem and the device having an endpoint assigned for access by an operating system executing on the processor subsystem such that the endpoint appears to the operating system as a logical hardware adapter, wherein the endpoint is assigned for access to a storage virtual appliance loaded as a virtual machine of a hypervisor, and wherein the hypervisor runs on the operating system;
enumerate the private device as a managed device of the device; and
map a portion of a virtual address space of an operating system executing on the processor subsystem to the private device, such that the private device is abstracted to the operating system as a virtual memory address of the operating system.

12. The article of claim 11, wherein the device comprises a Peripheral Component Interconnect device.

13. The article of claim 11, wherein the private device comprises one of a Peripheral Component Interconnect device and an Inter-Integrated Circuit device.

14. The article of claim 11, wherein the device comprises a hardware accelerator device.

15. The article of claim 11, wherein:
the processor subsystem executes a first virtual machine of the hypervisor and storage virtual appliance loaded as a second virtual machine of the hypervisor;
the device has a second endpoint assigned for access to the storage virtual appliance; and
the device is configured to accelerate data transfer operations between a first virtual machine and the storage virtual appliance via the endpoint and the second endpoint.

* * * * *